(No Model.)
J. DRADER & A. B. McKAY.
CULTIVATOR TOOTH.
No. 417,775. Patented Dec. 24, 1889.
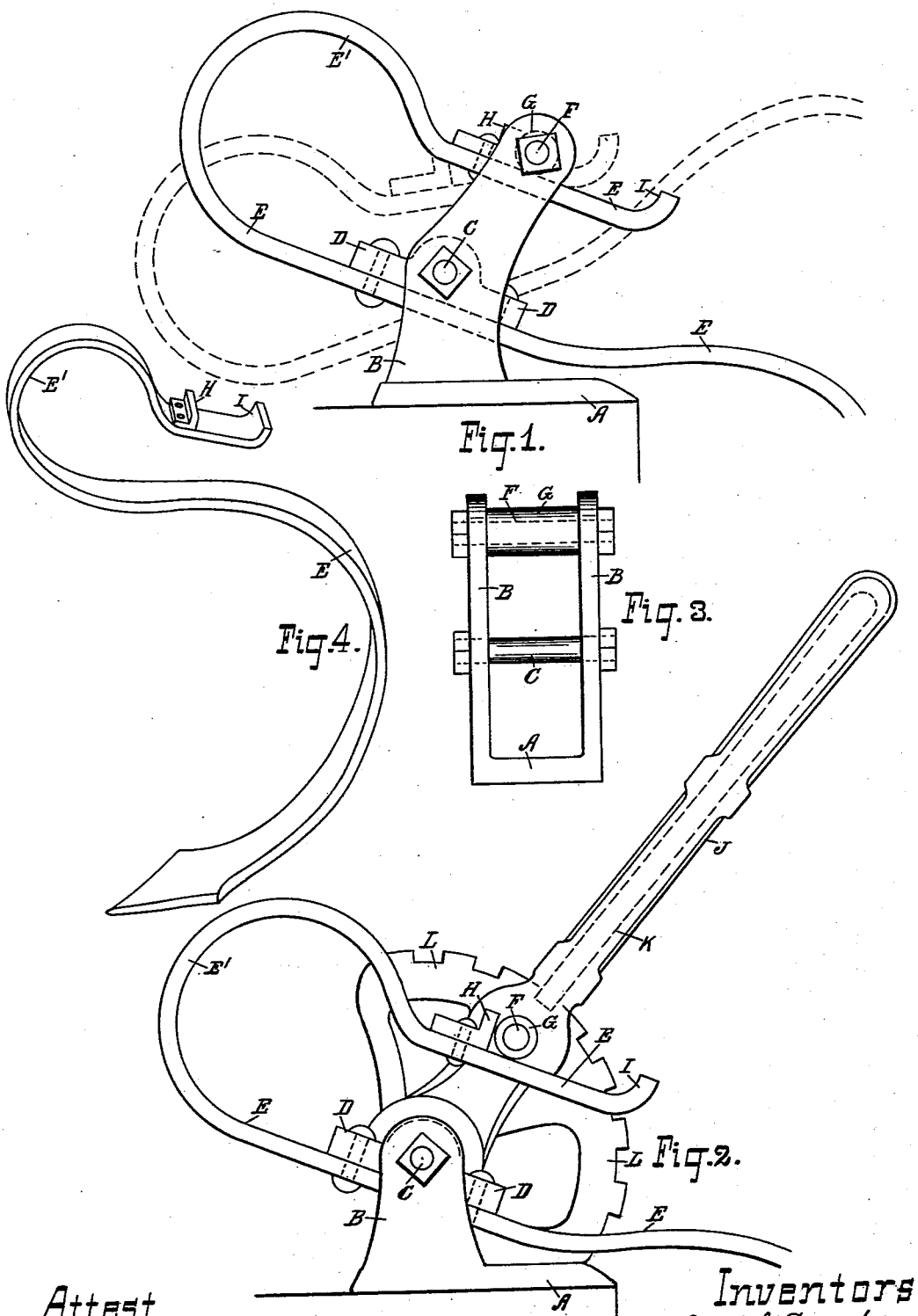
Attest
W. Edmunds
Carl Hayden
Inventors
Joseph Drader
Andrew B. McKay
by P. J. Edmunds
Att'y

UNITED STATES PATENT OFFICE.

JOSEPH DRADER AND ANDREW B. McKAY, OF LONDON, ONTARIO, CANADA; SAID McKAY ASSIGNOR TO SAID DRADER.

CULTIVATOR-TOOTH.

SPECIFICATION forming part of Letters Patent No. 417,775, dated December 24, 1889.

Application filed May 15, 1889. Serial No. 310,831. (No model.)

*To all whom it may concern:*

Be it known that we, JOSEPH DRADER and ANDREW B. McKAY, both subjects of the Queen of Great Britain, and both residents of the city of London, in the Province of Ontario, Canada, have jointly invented certain new and useful Improvements on Cultivator-Teeth, of which the following specification, taken in connection with the accompanying drawings, forms a full, clear, and exact description.

This invention consists of a cultivator-tooth pivotally secured to the frame of the implement, the upper returned end of which tooth engages with a pin or stud for the purpose of holding the tooth in the ground, and at the same time permit the tooth to raise and free itself automatically from a root, stone, or other unyielding obstruction, and then automatically return the tooth to its original position after it frees itself from said obstruction, as will be hereinafter first fully set forth and described, and then pointed out in the claims, reference being had to the accompanying drawings, already referred to, wherein—

Figure 1 is a side elevation of a device embodying our invention. Fig. 2 shows a modification of same. Fig. 3 is an end view of Fig. 1 with the tooth removed. Fig. 4 is a perspective view of one form of a cultivator-tooth. In this view the stop is also shown.

A designates a plate, which is rigidly secured to the frame of the implement.

B B are standards rigidly secured to or formed integral with the plate A.

C is a pivot stud or pin secured in the bearings B B.

D is a clip pivotally secured to said stud or pin C.

E is a spring-tooth formed with a returned portion E', and this tooth E is rigidly secured to the clip D.

F is a stud or pin secured in the standards B B or other suitable support.

G is an anti-friction roller encircling the stud or pin F.

H is a stop rigidly secured to the tooth E, or it may be in the form of a shoulder integral with the tooth E.

I is a curved shoulder at the extreme upper end of the tooth, which prevents the stud or pin F from disengaging from the returned end of said tooth, and which, with the stop H, limits the movement of said tooth.

In the modification shown in Fig. 2, J designates a lever pivoted on the stud or pin C; K, a spring-actuated dog pivoted on the lever J and adjusted to engage with recesses or notches in the segment L, the latter being rigidly secured to the plate A or other suitable support.

When the returned end of the spring-tooth E is compressed and held by the stud or pin F, the latter is adjusted to one side of the pivot stud or pin C and toward the rear of the tooth, as shown in Fig. 1. When in this position, the compression of the returned part E' of the tooth on the stud or pin F not only holds the stop H against said stud or pin F or the anti-friction roller G thereon, but also firmly holds the lower end of the tooth E in the ground for the purpose of cultivating the same; and when the point of the tooth E comes in contact with an unyielding obstruction—such as a root or stone—the greatly-increased pressure of this unyielding obstruction on the point of the tooth overcomes the pressure of the returned end of the tooth on the stud or pin F and permits the point of the tooth to rise automatically to free itself from the obstruction, and, the stud or pin F being adjusted eccentrically in relation to the curved returned end E' of the tooth E and toward the rear of the tooth, as the point of the tooth is raised the returned end of the tooth, extending beyond the stud or pin F toward the rear of the tooth, is inclined upward, and as the point of the tooth is further raised to pass over the unyielding obstruction, the returned portion of the tooth, between the pivot stud or pin C and the stud or pin F, is slightly lowered in the direction of the arc of a circle of which the pivot stud or pin C is the center; but, the outer end of the returned part of the tooth being held by the eccentrically-arranged stud or pin F from moving in the same direction, the upwardly-inclined returned end of the tooth is moved under the stud or pin F toward the front of the tooth, but the stud or pin F is prevented from disengaging therefrom by the shoulder I. This compresses the returned end of the tooth and the rear part of the tooth between the point and the pivot stud or pin C together. This moves the stop H away from the stud or pin F and greatly increases the compression of the returned end of the tooth on the stud or pin F, so that when the tooth frees itself from the obstruction this increased compression of the returned end of the tooth on the stud or pin F is sufficient to immediately project the tooth in the ground again to its normal working position, which is regulated by the stop H abutting against the stud or pin F or anti-friction roller G thereon, and the effect of this strain on the point of the tooth when coming in contact with and passing over an unyielding obstruction will not injuriously affect the tooth, from the fact that from this construction this strain will be expended to a great extent by the yielding or springing of the tooth between its point and the pivot stud or pin C and between the latter and the stud or pin F.

Our invention illustrated in Fig. 1 is intended to be secured to the frame of the implement, and when required to move this implement along the road or from one field to another it will be necessary to raise the frame of the implement in order to adjust the teeth secured thereto clear above the ground; but when it is not convenient to raise the frame of the implement we rigidly secure the stud or pin F to a lever J, (shown in Fig. 2,) and, as before described, provide this stud or pin F with an anti-friction roller G, which engages with the stop H on the returned end of the tooth E, as also before described, and we pivot this lever J on the stud or pin C and secure a recessed or notched segment L to the plate A or other suitable support, and on the lever J we pivot the spring-actuated dog K and adjust it to engage with the notches or recesses in the segment L, so that when using this form of construction, by grasping and operating the lever J, the operator is enabled to raise the tooth E clear above the ground or to any required position in the ground, according to the direction and distance said lever is operated, and when the lever J and tooth E are adjusted to the required position they are securely held at that point by engaging the spring-actuated dog K with notches or recesses in the segment L.

By adjusting and holding the lever J at a lower point on the segment L the point of the tooth not only enters the ground a greater distance, but the returned end E' of the tooth is further compressed by the stud or pin F, and the rigidity of the tooth in the ground is increased, because the pressure of the returned end E' of the tooth on the stud or pin F is increased. This would be necessary in cultivating hard or stiff ground. The same result would be attained by adjusting the pin F lower in its bearings, or by adjusting said pin in its bearings to a point toward the rear of the tooth.

Having thus described our invention, what we claim as new, and desire to secure by Letters Patent, is—

1. A pivotal cultivator-tooth E, having returned end E', stop H, and a stud or pin C, in combination with the stud or pin F, provided with an anti-friction roller G, and said studs or pins supported in suitable bearings, substantially as shown and described, and for the purpose set forth.

2. A pivotal cultivator-tooth E, having a returned end E', stop H, pivot stud or pin C, and bearings B, in combination with the stud or pin F, anti-friction roller G, and lever J, and means for holding said lever at the position to which it is adjusted, substantially as shown and described, and for the purpose set forth.

In testimony whereof we affix our signatures in the presence of the two undersigned witnesses.

JOSEPH DRADER.
ANDREW B. McKAY.

Witnesses:
P. J. EDMUNDS,
A. EDMUNDS.